US012560882B2

(12) United States Patent
Hano et al.

(10) Patent No.: US 12,560,882 B2
(45) Date of Patent: Feb. 24, 2026

(54) IMAGE FORMING APPARATUS, CONTROL METHOD OF THE IMAGE FORMING APPARATUS, AND NON-TRANSITORY COMPUTER-READABLE STORAGE MEDIUM WITH DISPLAY OF GUIDANCE ON PLACING DIRECTION OF SHEET HAVING PROJECTED PORTION

(71) Applicant: CANON KABUSHIKI KAISHA, Tokyo (JP)

(72) Inventors: Masami Hano, Chiba (JP); Yoshiro Tsukada, Chiba (JP); Toshiyuki Yamada, Tokyo (JP); Kota Kurokawa, Chiba (JP); Daisuke Katayama, Chiba (JP); Kyohei Kikuchi, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 58 days.

(21) Appl. No.: 18/607,782

(22) Filed: Mar. 18, 2024

(65) Prior Publication Data

US 2024/0345530 A1 Oct. 17, 2024

(30) Foreign Application Priority Data

Apr. 13, 2023 (JP) ................................ 2023-065893

(51) Int. Cl.
*G03G 15/00* (2006.01)

(52) U.S. Cl.
CPC ..... *G03G 15/6508* (2013.01); *G03G 15/5016* (2013.01); *G03G 15/6594* (2013.01); *G03G 2215/00409* (2013.01); *G03G 2215/1647* (2013.01)

(58) Field of Classification Search
CPC .......... G03G 15/6508; G03G 15/5016; G03G 15/6594; G03G 15/6588; G03G 2215/1647
See application file for complete search history.

(56) References Cited

U.S. PATENT DOCUMENTS

| | | | | |
|---|---|---|---|---|
| 6,716,492 | B1 * | 4/2004 | Moriya | B41J 11/0065 428/32.18 |
| 8,634,729 | B2 * | 1/2014 | Okamoto | G03G 15/6535 399/21 |
| 10,031,460 | B2 | 7/2018 | Hano | |
| 2022/0129713 | A1 | 4/2022 | Suzuki | |
| 2024/0085843 | A1 | 3/2024 | Yamamoto | |

FOREIGN PATENT DOCUMENTS

| | | | |
|---|---|---|---|
| JP | 2000305375 A * | 11/2000 | G03G 15/168 |

* cited by examiner

*Primary Examiner* — Arlene Heredia Ocasio
(74) *Attorney, Agent, or Firm* — Venable LLP

(57) ABSTRACT

An image forming apparatus for forming a toner image on a sheet subjected to perforation processing, wherein the sheet includes a projected portion generated at a periphery of a hole formed by the perforation processing, the image forming includes a stacking potion on which the sheet is stacked, a feeding path along which the sheet stacked on the stacking portion is fed, an image forming unit configured to form the toner image on an image bearing member, a transfer unit configured to transfer the toner image from the image bearing member onto the sheet fed to the feeding path, and a display configured to display guidance on a placing direction of the sheet depending on a surface where the projected portion of the sheet to be placed on the stacking portion is generated.

17 Claims, 10 Drawing Sheets

(a)

(b)

IMAGE FORMING APPARATUS, CONTROL METHOD OF THE IMAGE FORMING APPARATUS, AND NON-TRANSITORY COMPUTER-READABLE STORAGE MEDIUM WITH DISPLAY OF GUIDANCE ON PLACING DIRECTION OF SHEET HAVING PROJECTED PORTION

FIELD OF THE INVENTION AND RELATED ART

The present invention relates to an image forming apparatus such as a printer, a copying machine, a facsimile machine, or a multi-function machine.

An image forming apparatus disclosed in U.S. Patent Application Publication No. 2022/0129713 includes a stacking portion (cassette, deck, manual feeding tray) on which a sheet is stacked, and forms an image on the sheet fed from the stacking portion. In this U.S. Patent Application Publication No. 2022/0129713, use of a sheet subjected to feeding path processing (hereinafter, this sheet is referred to as a perforated sheet) is disclosed. The perforated sheet is a sheet in which cut-away portions (for example, slits, holes, or openings) having arbitrary intervals are formed in advance.

SUMMARY OF THE INVENTION

According to an aspect of the present invention, there is provided an image forming apparatus for forming a toner image on a sheet subjected to perforation processing, wherein the sheet includes a projected portion generating at a periphery of a hole formed by the perforation processing, the image forming apparatus comprising: a stacking portion on which the sheet is stacked; a feeding path along which the sheet stacked on the stacking portion is fed; an image forming unit configured to form the toner image on an image bearing member; a transfer unit configured to transfer the toner image from the image bearing member onto the sheet fed to the feeding path; and a display configured to display guidance on a placing direction of the sheet depending on a surface where the projected portion of the sheet to be placed on the stacking portion generates.

Further features of the present invention will become apparent from the following description of exemplary embodiments with reference to the attached drawings.

Figure 6:
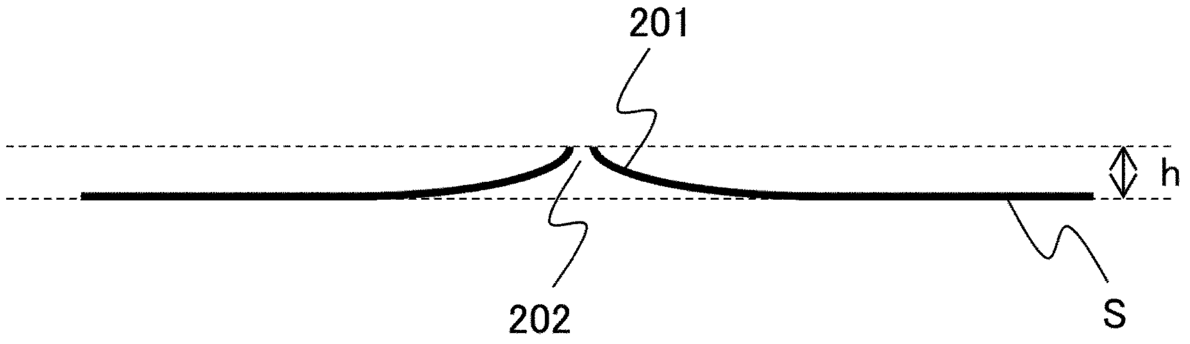
Figure 6:
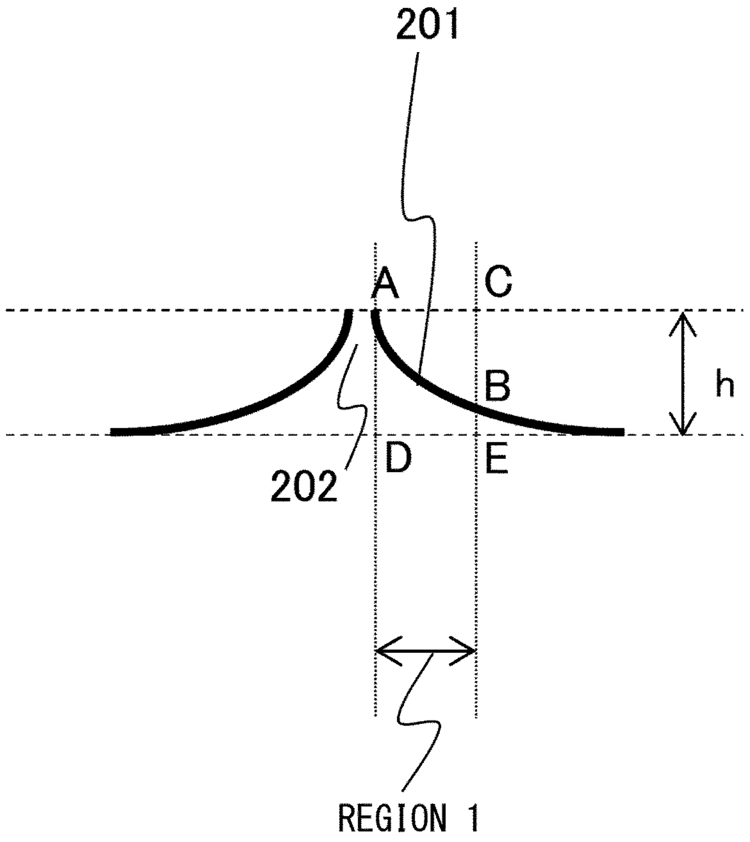

Part (a) of FIG. 6 is a sectional view showing a perforated sheet, and part (b) of FIG. 6 is an enlarged view showing a burr of the perforated sheet, which are for illustrating toner scattering generated due to the burr.

Figure 7:
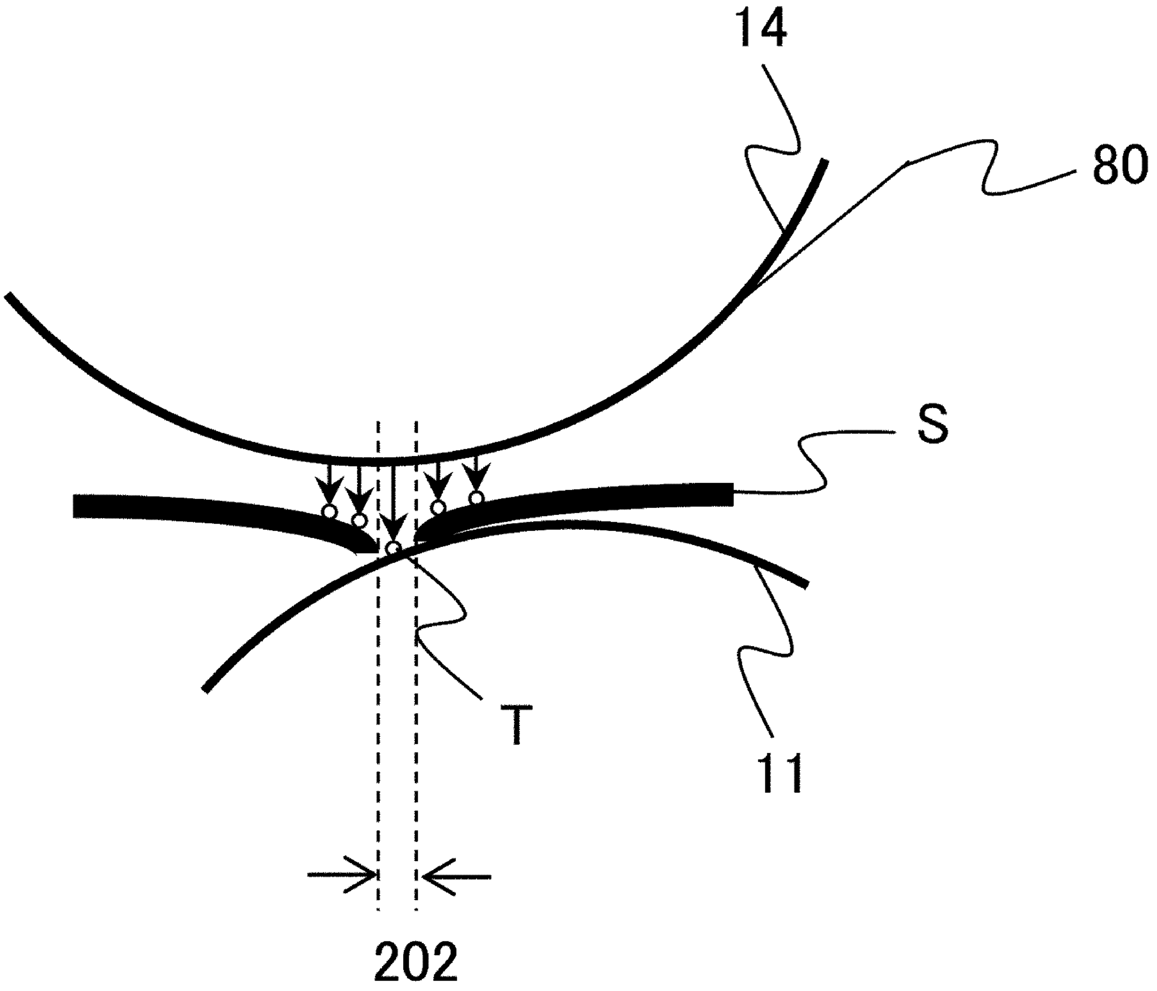

FIG. 7 is a schematic view for illustrating toner deposition onto an outer secondary transfer roller.

Figure 8:
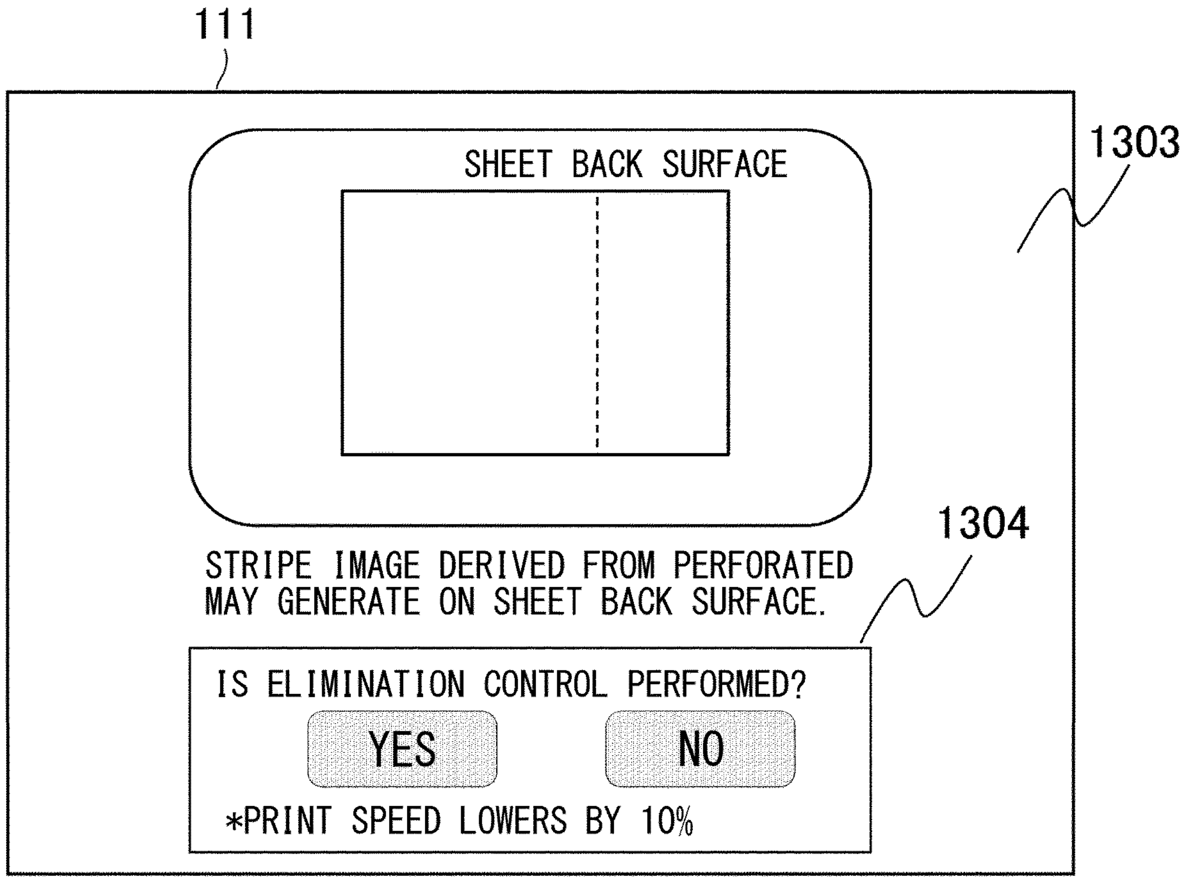

FIG. 8 is a schematic view showing a selection screen.

Figure 9:
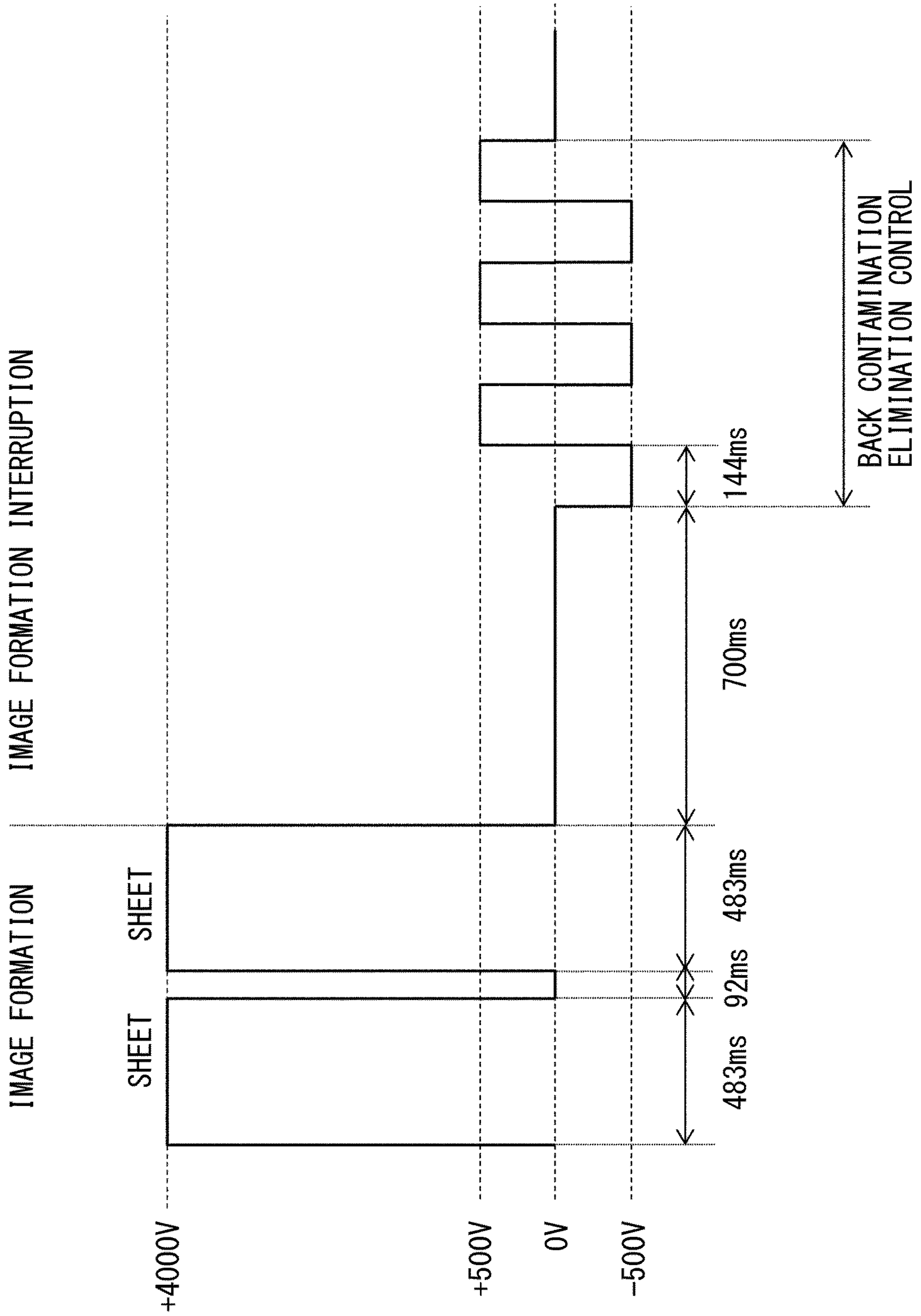

FIG. 9 is a timing chart for illustrating back contamination elimination control.

Figure 10:
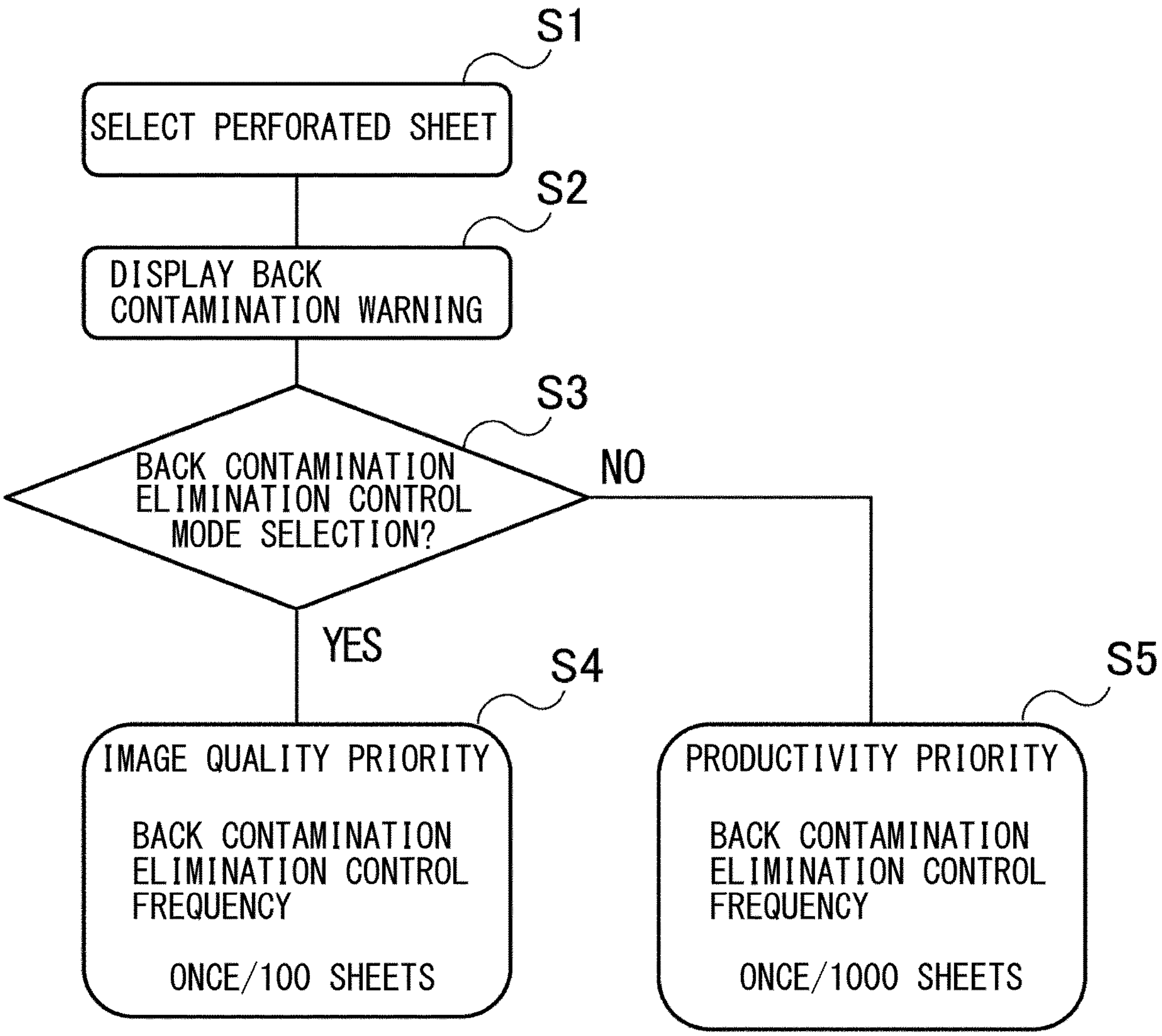

FIG. 10 is a flowchart showing a processing flow relating to a mode setting of the back contamination elimination control.

DESCRIPTION OF THE EMBODIMENTS

<Image Forming Apparatus>

An image forming apparatus of the present invention will be described using FIG. 1. An image forming apparatus 100 is an electrophotographic full-color printer of a tandem type. The image forming apparatus 100 includes image forming units Pa, Pb, Pc, and Pd for forming images of yellow, magenta, cyan, and black, respectively. The image forming apparatus 100 forms a toner image on a sheet S on the basis of image data sent from an original reading device (not shown) connected to, for example, the image forming apparatus 100 or from an external device 1000 such as a personal computer connected to the image forming apparatus 100. As the sheet S, it is possible to cite sheet materials, such as plain paper, thick paper, roughened paper, embossed paper and coated paper.

A feeding process of the sheet S in the image forming apparatus 100 will be described. The sheet S is capable of being stacked in a cassette 10 as a stacking portion. Or, the sheet S is capable of being stacked on a manual feeding tray 17 as the stacking portion. The sheet stacked in the cassette 10 or on the manual feeding tray 17 is sent in accordance with an image forming timing by a supplying roller 13. The manual feeding tray 17 is provided so as to be openable and closable, and a user is capable of arbitrarily opening and closing the manual feeding tray 17.

The sheet S fed by the supplying roller 13 passed passes through a U-shaped path of a feeding (conveying) path 114, and is fed (conveyed) toward a registration roller pair 12 provided along the feeding path 114. Then, the sheet S is subjected to oblique movement correction or timing correction in the registration roller pair 12, and thereafter, is sent to a secondary transfer portion T2. The secondary transfer portion T2 is a transfer nip formed by an inner secondary transfer roller 14 and an outer secondary transfer roller 11, and the toner image is transferred onto the sheet S in response to application of a secondary transfer voltage to the outer secondary transfer roller 11 as a transfer portion by a power source 90. Incidentally, only one cassette 10 is shown in FIG. 1, but a plurality of cassettes 10 may be provided. The registration roller pair 12 functions as a feeding (conveying) unit for feeding the sheet S from the cassette 10 or the manual feeding tray 17 to the secondary transfer portion T2.

As regards the sheet S feeding process until the above-described secondary transfer portion T2, an image forming process of the image sent to the secondary transfer portion T2 at a similar timing will be described. First, although the image forming units will be described, the respective color image forming units Pa, Pb, Pc and Pd are constituted substantially similar to each other except that colors of toners used in developing devices 1*a*, 1*b*, 1*c* and 1*d* are yellow (Y), magenta (M), cyan (C), and black (K), respectively, which are different from each other. Therefore, in the following, as a representative, the image forming unit Pd for black will be described, and other image forming units Pa, Pb and Pc will be omitted from description.

The image forming unit Pd is principally constituted by the developing device 1*d*, a charging device 2*d*, a photosensitive drum 3*d*, a photosensitive drum cleaner 4*d*, an exposure device 5*d*, a primary transfer roller 6*d*, and the like. A surface of a rotating photosensitive drum 3*d* is electrically charged uniformly in advance by the charging device 2*d*, and thereafter, an electrostatic latent image is formed by the exposure device 5*d* driven on the basis of a signal of image information. Then, the electrostatic latent image formed on the photosensitive drum 3*d* is developed into a toner image with use of a developer by the developing device 1*d*. Then, the toner image formed on the photosensitive drum 3*d* is primary-transferred onto an intermediary transfer belt 80 in response to application of a primary transfer voltage to the primary transfer roller 6*d* disposed while sandwiching the intermediary transfer belt 80 therebetween. Primary transfer residual toner slightly remaining on the photosensitive drum 3*d* is collected to the photosensitive drum cleaner 4*d*.

The intermediary transfer belt 80 as an image bearing member is stretched by the inner secondary transfer roller 14, and stretching rollers 15 and 16, and is driven in an arrow R2 direction. The stretching roller 16 also functions as a driving roller for driving the intermediary transfer belt 80. The respective color image forming processes performed in parallel by the image forming units Pa to Pd are carried out at timings when an associated toner image is superposedly transferred successively onto an upstream toner image primarily transferred onto the intermediary transfer belt 80. As a result, finally, a full-color toner image is formed on the intermediary transfer belt 80 and is fed to the secondary transfer portion T2 while being carried on the intermediary transfer belt 80. Incidentally, secondary transfer residual toner after passing through the secondary transfer portion T2 is removed from the intermediary transfer belt 80 by a belt cleaner 22. Incidentally, an image forming unit portion 150 capable of forming the toner image on the sheet S is constituted by the image forming units Pa to Pd, the intermediary transfer belt 80, and the rollers (14, 15, 16), the outer secondary transfer roller 11, and the like.

In the above, by the above-described feeding process and the above-described image forming process, in the secondary transfer portion T2, a timing of the sheet S and a timing of the full-color toner image coincide with each other, so that secondary transfer is carried out. At this time, the toner on the intermediary transfer belt 80 is transferred onto the sheet S by the secondary transfer voltage applied to the outer secondary transfer roller 11. In a transfer nip, the outer secondary transfer roller 11 functions as a transfer unit for transferring the toner image from the intermediary transfer belt 80 onto the sheet S. Thereafter, the sheet S is fed to a fixing device 50, in which heat and pressure are applied to the sheet S, so that the toner image is fixed on the sheet S. The fixing device 50 nips and feeds the sheet S on which the toner image is formed, and applies heat and pressure to the fed sheet S, so that the fixing device 50 fixes the toner image on the sheet S. That is, the toner of the toner image formed on the sheet S is melted and mixed by application of heat and pressure, and is fixed as the full-color image on the sheet S. The sheet S on which the toner image is discharged onto a discharge tray 95 provided outside an apparatus main assembly of the image forming apparatus 100. Or, in the case where another post-step unit (not shown) such as a finisher apparatus is connected to the apparatus main assembly of the image forming apparatus 100, the sheet S on which the toner image is fixed is fed to the post-step unit. The finisher apparatus performs, for example, punch processing in which the sheet S is perforated, stapling (processing) in which a plurality of sheets S are bundled and stapled, and the like processing.

<Developer>

In the image forming apparatus 100 of the present invention, a two-component developer containing the toner and a carrier is used. The toner contains a binder resin, a colorant, and a parting agent. As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer and a polyester to each other, an epoxy resin, a styrene-butadiene copolymer, and the like. As the colorant, it is possible to use known colorants for yellow (Y), magenta (M), cyan (C), and black (K), respectively.

As the parting agent, for example, it is possible to cite aliphatic hydrocarbon waxes such as low-molecular weight polyethylene wax, low-molecular weight olefin copolymer wax, microcrystalline wax, Fischer-Tropsch wax, and paraffin wax; oxide of the aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

<Control Constitution of Image Forming Apparatus>

Next, a control constitution of the image forming apparatus 100 will be described using FIG. 2 while making reference to FIG. 1. Incidentally, to a controller 101, in addition to devices (portions) illustrated in FIG. 2, various devices such as motors and power sources are connected, but are not the main object of the present invention herein, and therefore, will be omitted from illustration and description.

The controller 101 includes a CPU (central processing unit) 102, a ROM (read only memory) 103, and a RAM (random access memory) 104, and controls the entirety of the image forming apparatus 100. In the ROM 103, various programs such as an image forming job and the like are stored. In the RAM 104, various data such as image data acquired from, for example, an operating portion 110 or an external device 1000 (see FIG. 1) are stored.

When the controller 101 receives, for example, a start instruction of the image forming job, the controller 101 executes an image forming program stored in the ROM 103, and thus controls the image forming units Pa to Pd in order to form the image on the sheet S. Further, as described later, the controller 101 is capable of executing a voltage control program (back contamination elimination control) for applying voltages to the outer secondary transfer roller 11 while repetitively switching polarities thereof without passing the sheet S through the secondary transfer portion in the case where an image-formed sheet number of the sheets reaches a threshold. At that time, the power source 90 for applying the voltage to the outer secondary transfer roller 11 is controlled by the controller 101. Incidentally, the RAM 104 is capable of temporarily storing a calculation (computation) processing result or the like with execution of the various programs.

The image forming apparatus 100 includes an operating portion 110 (FIG. 1) including a display portion 111 (display). The operating portion 110 is connected to the controller 101. The operating portion 110 is capable of causing the display portion 111 to display various screens presenting the various programs and various data or the like, receives input of a start of the various programs and input of the various data, and the like, in response to an operation by a user through the operating portion 110. The operating portion 110 functions as a user interface receiving the user input.

<Operating Portion>

Figure 3:
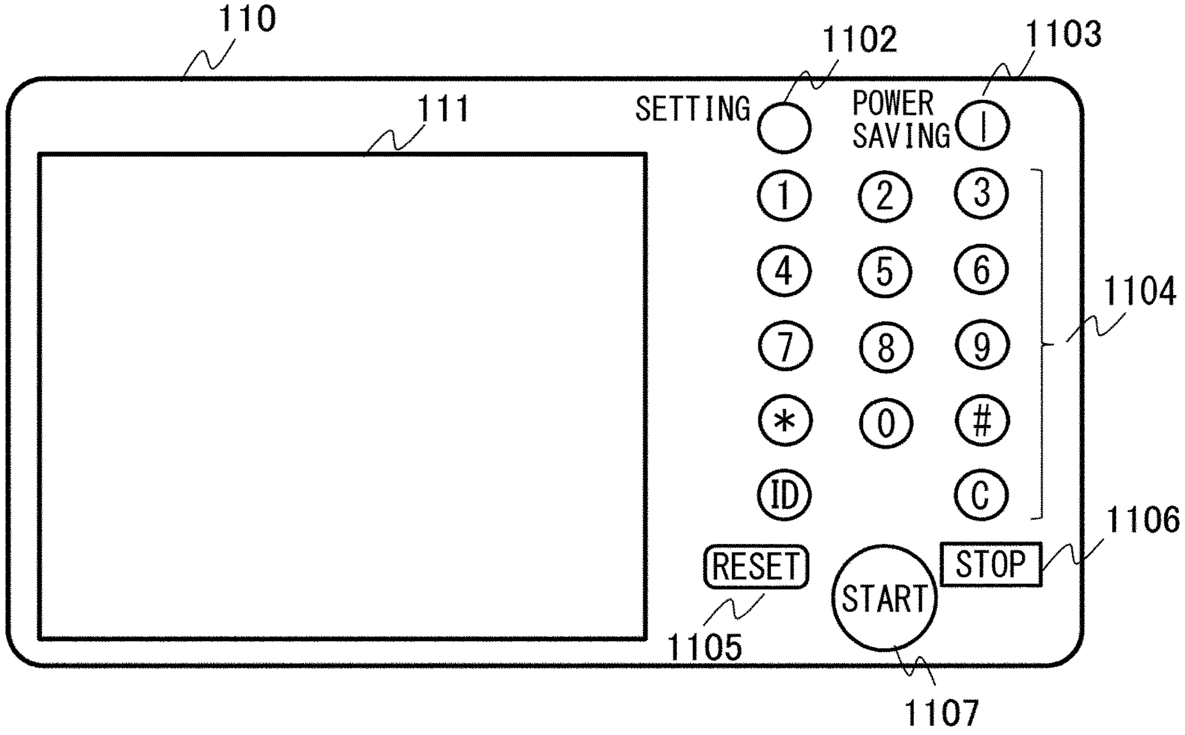
FIG. 3 is a schematic view showing an operating portion.

The operating portion 110 will be described using FIG. 3. As shown in FIG. 3, the operating portion 110 includes a display portion 111 such as a liquid crystal monitor, and hardware keys. The display portion 111 may be a touch panel on which the user is capable of performing a touch operation, and is capable of displaying a screen including, as software keys, various buttons and switches. At the display portion 111, a sheet selection screen (see FIG. 4) and a sheet set screen (see FIG. 5), and the like which are described later are displayed.

As the hardware keys, for example, there are a setting key 1102, a power saving key 1103, a hard key group 1104, a reset key 1105, a stop key 1106, a start key 1107, and the like. The start key 1107 has a function of instructing starts of, for example, reading printing (copying) of an original image and other operations. In the start key 1107, LEDs of two colors of green and red are incorporated, and the start key 1107 indicates that the start of the operation is enabled during turning-on of the green LED, and indicates that the start of the operation is disabled during turning-on of the red LED. The stop key 1106 has a function of once stopping image formation or the like during operation. The hard key group 1104 includes, for example, numeric keys, a clear key, an authentication key, and the like.

The power saving key 1103 has a function of shifting an operation in a mode of the image forming apparatus 100 from an operation in a normal mode to an operation in a sleep mode in which the image forming apparatus 100 is on standby in power saving or of returning the operation in the sleep mode to the operation in the normal mode. That is, the image forming apparatus 100 shifts in operation mode to the sleep mode when the user presses the power saving key 1103 in the operation in the normal mode, and shifts in operation mode to the normal mode when the user presses the power saving key 1103 in the operation in the sleep mode. The setting key 1102 is used when, for example, a setting of a sheet kind or the like is made. The reset key 1105 is used when, for example, the set kind of the sheet S is canceled.

<Sheet Selection Screen>

At the display portion 111, the sheet selection screen is displayed. The sheet selection screen is displayed at the display portion 111, for example, in the case where the user operates a sheet kind selection button from a menu screen (not shown) displayed at the display portion 111 or in the case where the user opens the cassette 10 or the manual feeding tray 17. The sheet selection screen will be described using FIG. 4.

Figure 4:
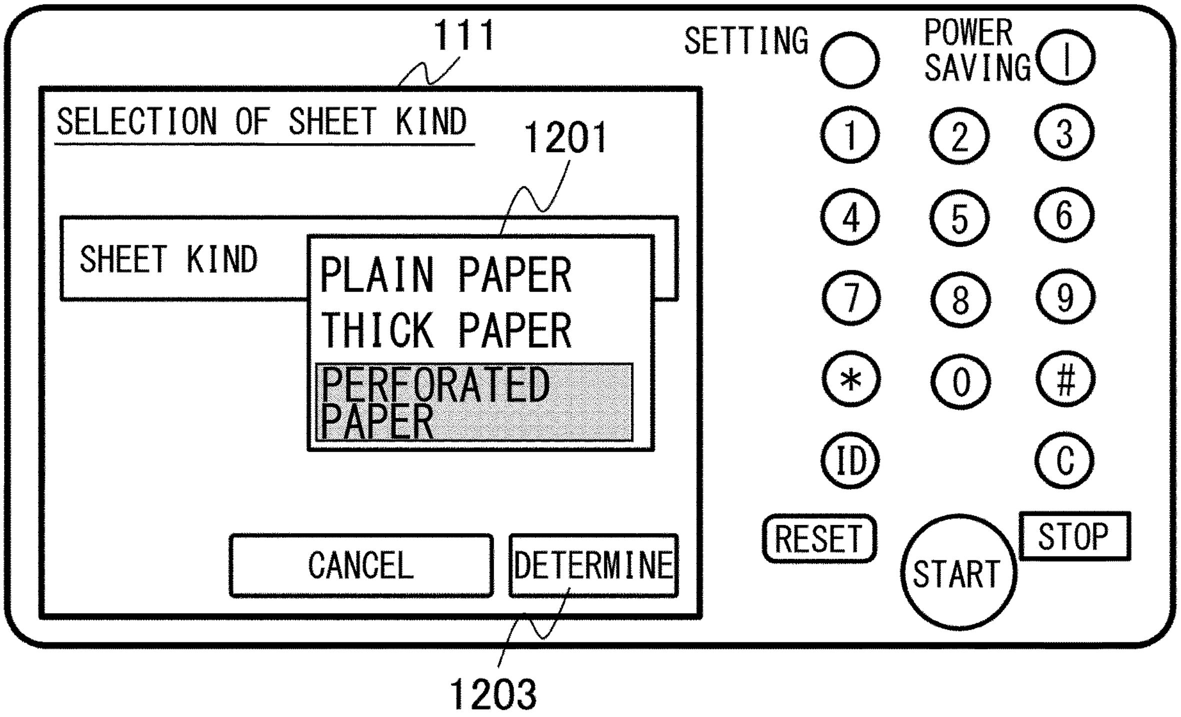
FIG. 4 is a schematic view showing a sheet selection screen.

As shown in FIG. 4, in the sheet selection screen, kinds of the sheet S which are stored in advance in the ROM 103 (see FIG. 2) and on which the image is capable of being formed by the image forming apparatus 100 are displayed in a dialogue box 1201. Here, plain paper, thick paper, and perforated paper (perforated sheet) are displayed, but the user is capable of displaying other kinds in which the image is capable of being formed, by scrolling a screen displayed in the dialog box 1201. The user is capable of selecting the kind of the sheet S by touching an arbitrary kind from a plurality of kinds displayed in the dialog box 1201. The selected kind of the sheet S is determined by operating a determination button 1203.

Here, in the case where the image is formed on the perforated sheet by using a conventional image forming apparatus, there was a possibility that an image defect is generated in some instances. In the perforated sheet, a projected portion is generated at a periphery of a hole formed by perforation processing. This projected portion is also referred to as a burr. In the case where toner is transferred onto a surface where the burr (projected portion) of the perforated sheet exists, this burr (projected portion) causes disturbance of an electric field in the secondary transfer portion T2. By this, toner to be transferred onto the burr (projected portion) and a neighborhood thereof scatters, so that an image defect is generated. The surface where this burr of the perforated sheet exists is capable of being recognized, for example, by touch of a portion subjected to perforation processing with finger(s) of a person. The image forming apparatus 100 of the present invention notifies a placing direction of the perforated sheet when the perforated sheet is placed (stacked) on a stacking portion of the image forming apparatus 100 in order not to cause toner scattering due to transfer of the image onto the surface where the burr (projected portion) exists.

<Sheet Set Screen>

Figure 5:
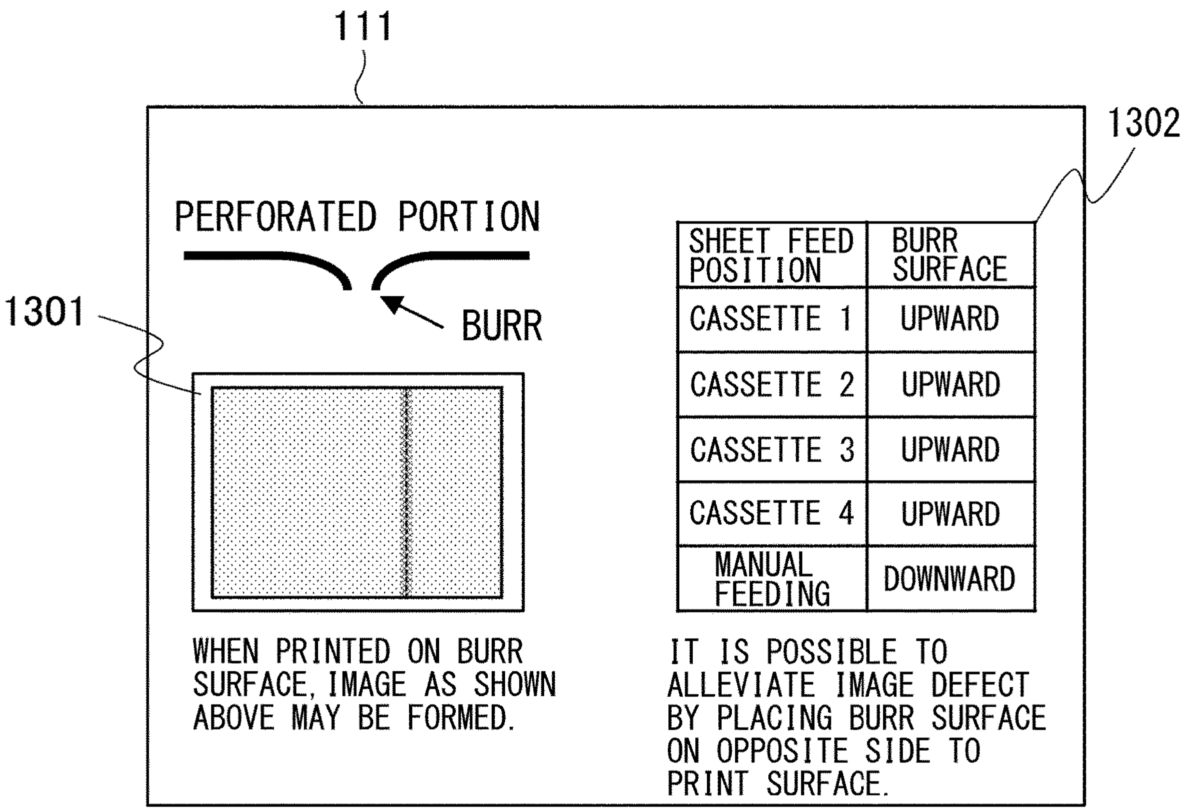
FIG. 5 is a schematic view showing a sheet set screen.

In a state in which the perforated sheet is selected as the kind of the sheet S in the sheet (selection screen, a sheet set screen displayed at the display portion 111 in the case where the determination button 1203 is operated is shown in FIG. 5. When user selection information on the kind of the sheet S is received by the operating portion 110, the controller 101 causes the display portion 111 to display the sheet set screen as guidance on the placing direction of the sheet S. Incidentally, in FIG. 5, the case where 4 cassettes 10 are displayed is shown as an example.

As shown in FIG. 5, in the sheet set screen, a warning screen 1301 and a set mode screen 1302 are displayed. In the set mode screen 1302, as information on front/back of the perforated sheet when the perforated sheet is stacked (placed) on the cassette 10 or the manual feeding tray 17, a placing direction (front/back direction) as to whether the perforated sheet is placed with a surface where the projected portion which is referred to as the burr and which is generated by the perforation processing (hereinafter, referred to as a burr surface) upward or is placed with the burr surface downward is displayed. That is, the information on the front/back is information to the effect that the burr surface of the perforated sheet is placed in which direction of directions of the front/back (which can also be referred to as upward/downward). The placing direction (front/back direction) is displayed as a direction such that the burr surface of the perforated sheet which passes from the cassette 10 or the manual feeding tray 17 through the feeding path 114 and then which is fed to the secondary transfer portion T2 does not become an image transfer surface (print surface) onto which the toner image is transferred in the secondary transfer portion T2.

Figure 1:
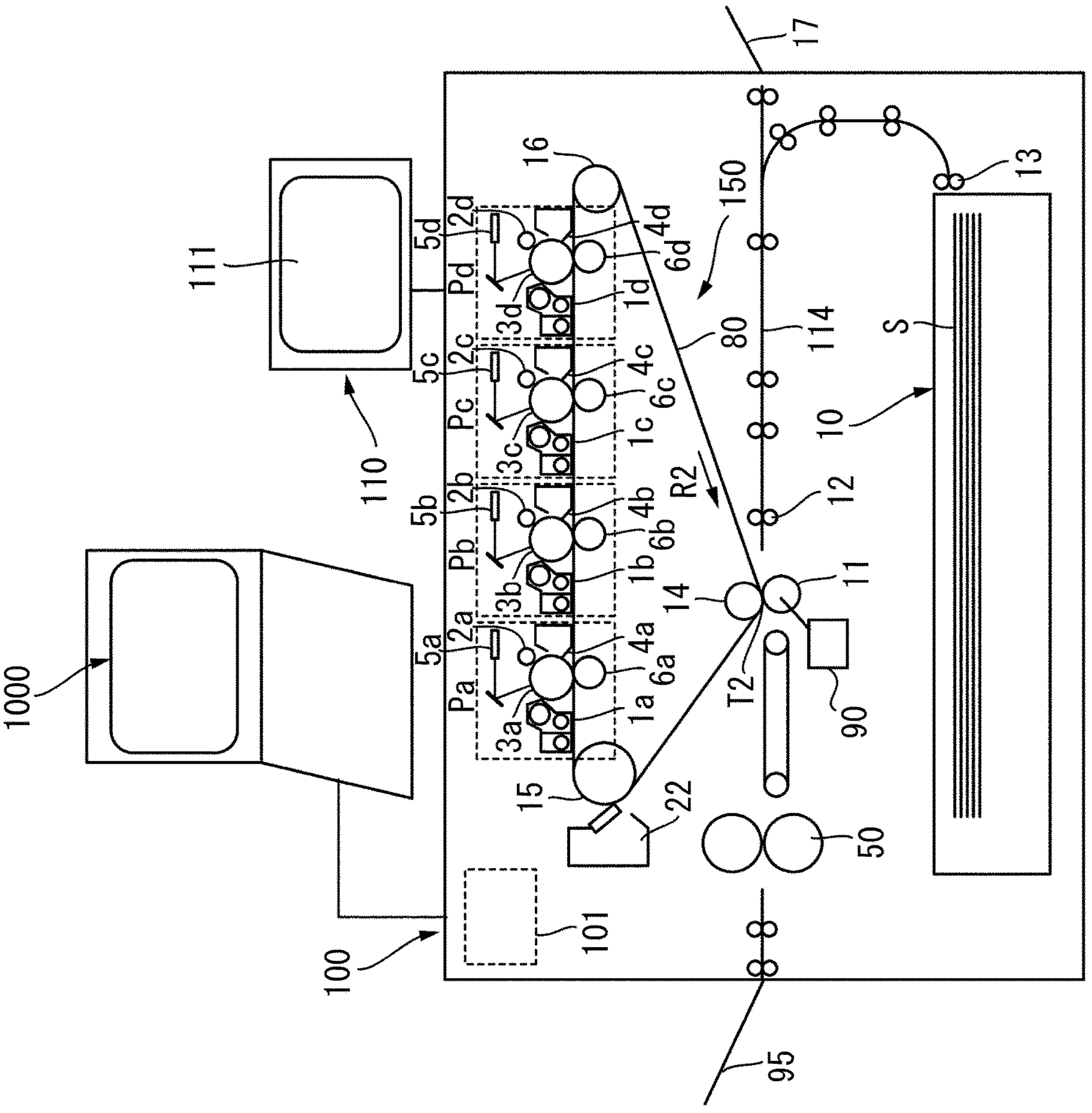
FIG. 1 is a schematic view showing an image forming apparatus.
Figure 2:
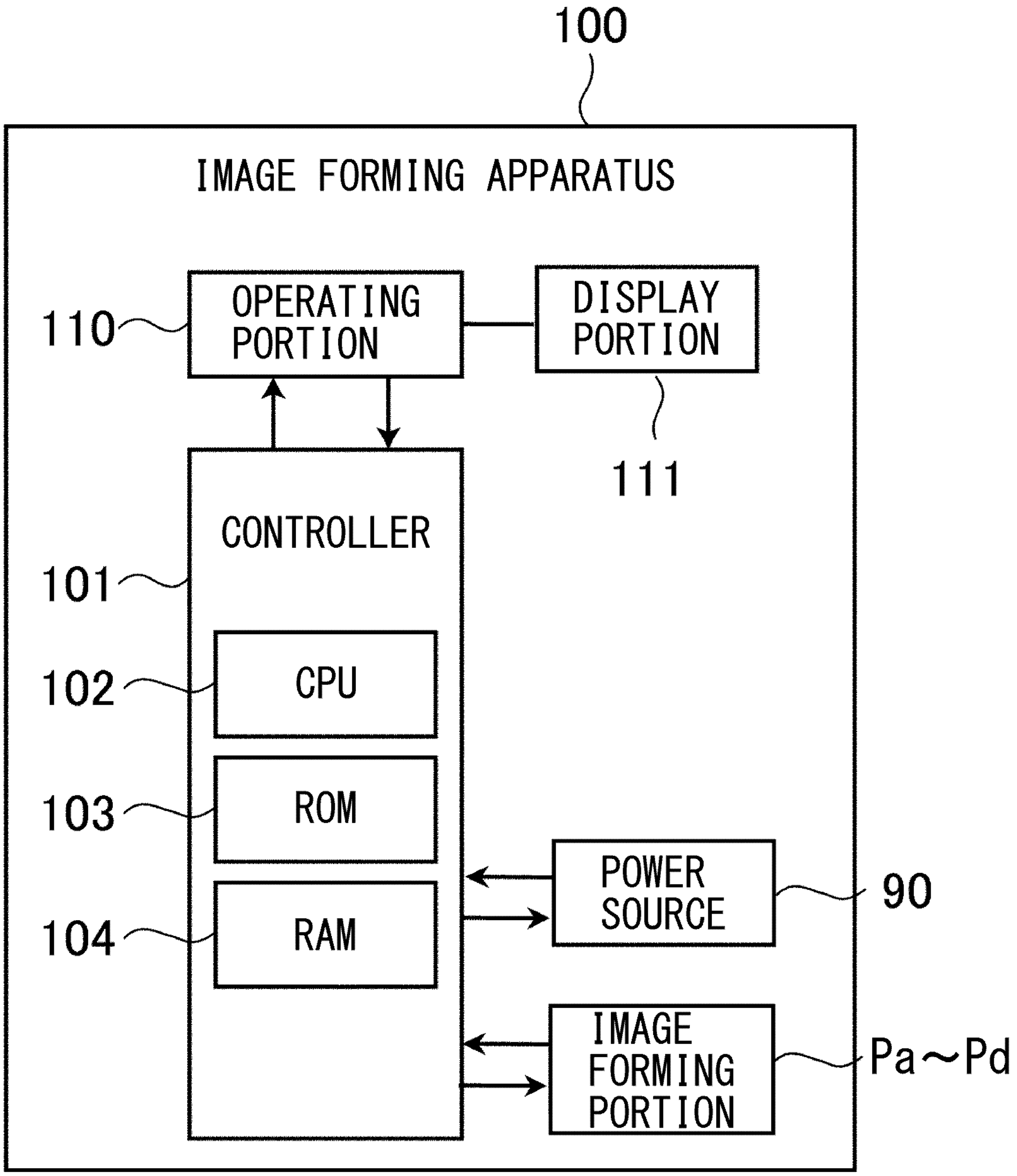
FIG. 2 is a control block diagram showing a control constitution of the image forming apparatus.

As shown in FIG. 1, the sheet S placed in the cassette 10 is fed toward the secondary transfer portion T2 by being turned upside down when passing through a U-shaped path of the feeding path 114. For that reason, as shown in FIG. 5, as a state when the perforated sheet is placed in the cassette 10, a message that the perforated sheet is placed so that the burr surface (corresponding to a first surface in this case) is directed upward (front surface). In the case where the perforated sheet is placed in the cassette 10 so that the burr surface is directed upward (front surface), the burr surface of the perforated sheet fed from the cassette 10 does not face a front surface of the intermediary transfer belt 80 in the secondary transfer portion T2. The burr surface faces toward the outer secondary transfer roller 11.

On the other hand, as shown in FIG. 1, the sheet S placed on the manual feeding tray 17 passes along a straight path of the feeding path 114. For that reason, the sheet S fed from the manual feeding tray 17 is fed to the secondary transfer portion T2 without being turned upside down. Therefore, as shown in FIG. 5, as a state when the perforated sheet is placed on the manual feeding tray 17, a message that the perforated sheet is placed so that the burr surface (corresponding to a second surface in this case) is directed downward (back surface). In the case where the perforated sheet is placed in the manual feeding tray 17 so that the burr surface is directed downward (back surface), the burr surface of the perforated sheet fed from the manual feeding tray 17 does not face a front surface of the intermediary transfer belt 80 in the secondary transfer portion T2. The burr surface faces toward the outer secondary transfer roller 11.

As described above, conventionally, in the case where the image was formed on the perforated sheet, there was a liability that the image defect was generated during the transfer of the toner image onto the burr surface side. This is because during the secondary transfer of the toner image from the intermediary transfer belt 80 onto the perforated sheet in the secondary transfer portion T2, toner is liable to scatter due to the burr. Here, the toner scattering generation resulting from the burr will be described using parts (a) and (b) of FIG. 6. Part (a) of FIG. 6 is a sectional view showing a perforated sheet, and part (b) of FIG. 6 is an enlarged view showing a burr of the perforated sheet.

As shown in part (a) of FIG. 6, in a perforated sheet(S), a burr 201 is generated during perforation processing. The burr 201 of the perforated sheet(S) is pressed by being nipped and fed when the perforated sheet(S) passes through the secondary transfer portion T2, so that a height h of the burr 201 becomes low compared with the height h of the burr 201 before passing through the secondary transfer portion T2. However, in the case where the perforated sheet(S) is nipped and fed to the secondary transfer portion T2 in a direction in which the burr surface of the perforated sheet(S) becomes the image transfer surface, the burr 201 is not sufficiently pressed by contact pressure between the inner secondary transfer roller 14 and the outer secondary transfer roller 11 (see FIG. 1), so that a gap is formed between the perforated sheet(S) and the intermediary transfer belt 80 at the burr surface. To the secondary transfer portion T2, a secondary transfer voltage is applied, and in the gap, electric discharge is liable to be generated, so that the toner is liable to scatter in the neighborhood of the burr 201.

As shown in part (b) of FIG. 6, a region pressed by the contact pressure between the inner secondary transfer roller 14 and the outer secondary transfer roller 11 is a region ABC enclosed by a rectilinear line passing through the height h of the burr 201 in a region 1 from a perforated portion 202, penetrating through the front surface to the back surface of the perforated sheet(S) with respect to a feeding (conveying) direction, to a position spaced from the perforated portion 202 by a small distance on the burr surface. On the other hand, on a surface on a side opposite from the perforated sheet (hereinafter, this surface is referred to as a non-perforated sheet), the region pressed by the contact pressure is a region ADEB. It turned out by the present inventors that although the region 1 varies depending on the height h of the burr 201 and rigidity of the perforated sheet(S), in the case where the above-described region ABC and the above-described region ADEB are compared with each other, the gap generated when the perforated sheet(S) passes through the secondary transfer portion T2 is larger in the region ABC than in the region ADEB. In a larger gap, a stronger electric field is generated, so that the toner is liable to scatter on the burr surface where the region ABC is formed. For that reason, at the burr surface, in a peripheral portion of the perforated portion 202, an image defect such that a toner density (concentration) becomes thicker in a stripe shape than in another portion can be generated.

As described above, the placing direction (front/back direction) of the perforated sheet capable of suppressing such toner scattering is displayed on the set mode screen 1302 separately between the cassette 10 and the manual feeding tray 17 different in feeding mode to the secondary transfer portion T2.

Returning to FIG. 5, on the sheet set screen, in addition to the set mode screen 1302, the warning screen 1301 is displayed as information on the influence on the image formed on the perforated sheet. On the warning screen 1301, warning display to the effect that the image defect generates in the case where the perforated sheet is placed in a direction opposite to the placing direction (front/back direction) displayed on the set mode screen 1302 is displayed. Further, on the warning screen 1301, a warning image showing the image defect capable of generating in the case where the perforated sheet is placed in the direction opposite to the placing direction (front/back direction) displayed on the set mode screen 1302 is displayed. The warning image is an image showing the image defect capable of generating resulting from the burr 201 of the perforated sheet. Incidentally, the sheet set screen may also have a constitution in which the warning screen 1301 is not displayed but only the set mode screen 1302 is displayed.

Further, the sheet set screen is not limited to a constitution in which the placing direction of the perforated sheet is displayed for each of the plurality of cassettes 10 (cassettes 1 to 4) and the manual feeding tray 17. For example, in the case where the cassette in which the perforated sheet is accommodated is selected from the plurality of cassettes 10 and the manual feeding tray 17, the sheet set screen on the placing direction of the perforated sheet when the perforated sheet is placed in the selected cassette may only be required to be displayed. Or, in the case where the manual feeding tray 17 on which the perforated sheet is placed is selected from the plurality of cassettes 10 and the manual feeding tray 17, the sheet set screen on the placing direction of the perforated sheet when the perforated sheet is placed on the selected manual feeding tray 17 may only be required to be displayed. Further, for example, a constitution in which in the case where an unshown sheet sensor provided in the manual feeding tray 17 detects that the sheet is placed on the manual feeding tray 17, the sheet set screen is displayed at the display portion 111 without displaying the sheet set screen may also be employed. In this case, the placing direction (front/back direction) of the perforated sheet when the perforated sheet is placed on the manual feeding tray 17 is displayed on the sheet set screen.

As described above, in the image forming apparatus 100 of the present invention, the sheet set screen is displayed at the display portion 111 in the case where the perforated sheet is selected as the kind of the sheet. In the sheet set screen, the set mode screen 1302 is included (see FIG. 5). In the sheet set mode screen 1302, the placing direction (front/back direction) as to whether the perforated sheet is placed with the burr surface of the perforated sheet upward or downward is displayed. The set mode screen 1302 displayed at the display portion 111 is guidance on the placing direction of the sheet S depending on a surface on which a projected portion of the sheet S to be placed in the cassette 10 (or on the manual feeding tray 17). The placing direction (front/back direction) of the perforated sheet is displayed as a direction in which the burr surface of the perforated sheet fed from the cassette 10 or the manual feeding tray 17 does not become the image transfer surface. In order to suppress occurrence of the image defect resulting from the burr (projected portion) when the image is formed on the perforated sheet, the perforated sheet may only be required to be placed on the cassette 10 or the manual feeding tray 17 so that the surface free from the burr (the non-burr surface) becomes the image transfer surface. Further, in the set mode screen 1302, different placing directions are displayed between the case where the perforated sheet is placed in the cassette 10 and the case where the perforated sheet is placed on the manual feeding tray 17. Accordingly, the user is capable of suppressing the occurrence of the image defect resulting from the burr only by placing the perforated sheet in the cassette 10 or on the manual feeding tray 17 which while making reference to the set mode screen 1302. That is, according to the image forming apparatus 100 of the present invention, when the image is formed on the sheet subjected to the perforation processing, it is possible to notify the placing direction of the perforated sheet in which the image defect does not readily occur.

Further, in the sheet set screen, the warning screen 1301 is displayed together with the set mode screen 1302. In the warning screen 1301, a warning display indicating a message that the image defect occurs in the case where the perforated sheet is placed in the direction opposite to the placing direction (front/back direction) displayed in the set mode screen 1302 is made. Further, in the warning screen 1301, a warning image indicating the image defect capable of occurring in the case where the perforated sheet is placed in the direction opposite to the placing direction (front/back direction) displayed in the set mode screen 1302. By displaying the warning display and the warning image, it is possible to suppress that the user erroneously places the perforated sheet in the direction opposite to the placing direction (front/back direction) displayed in the set mode screen 1302.

Further, in the sheet set screen shown in FIG. 5, a message that the perforated sheet is placed so that the burr surface is directed upward (front surface) in the case where the perforated sheet is placed in the cassette 10 was displayed, and a message that the perforated sheet is placed so that the burr surface is directed downward (back surface) in the case where the perforated sheet is placed on the manual feeding tray 17. However, the sheet set screen is not limited to the constitution showing whether to direct the burr surface toward which direction. In the sheet set screen, a message that the perforated sheet is placed so that the non-burr surface is directed downward (back surface) in the case where the perforated sheet is placed in the cassette 10 may also be displayed, and a message that the perforated sheet is placed so that the non-burr surface is directed upward (front surface) in the case where the perforated sheet is placed on the manual feeding tray 17.

Further, the image forming apparatus 100 shown in FIG. 1 has a constitution in which the sheet S fed from the cassette 10 is conveyed to the transfer nip via the U-shaped path and in which the sheet S fed from the manual feeding tray 17 is conveyed to the transfer nip via the straight path. However, the image forming apparatus 100 is not limited to the above-described constitution. For example, another image forming apparatus has a constitution in which the sheet S fed from the cassette 10 is conveyed to the transfer nip via an L-shaped path and in which the sheet S fed from the manual feeding tray 17 is conveyed to the transfer nip via a reverse L-shaped path.

In the sheet set screen in this constitution, a message that the perforated sheet is placed so that the burr surface is directed downward (back surface) in the case where the perforated sheet is placed in the cassette 10 was displayed, and a message that the perforated sheet is placed so that the burr surface is directed upward (front surface) in the case where the perforated sheet is placed on the manual feeding tray 17. Or, a message that the perforated sheet is placed so that the non-burr surface is directed upward (front surface) in the case where the perforated sheet is placed in the cassette 10 may also be displayed, and a message that the perforated sheet is placed so that the non-burr surface is directed downward (back surface) in the case where the perforated sheet is placed on the manual feeding tray 17.

Incidentally, even when the user places the perforated sheet in the cassette 10 or on the manual feeding tray 17 in accordance with the display in the set mode screen 1302, another sheet S causes a back contamination during formation of the image on another sheet S after formation of the image on the perforated sheet. The back contamination is a phenomenon that the toner is deposited on the outer secondary transfer roller 11 in the secondary transfer portion T2 during the secondary transfer of the toner (image) onto the perforated sheet and then the burr surface of another sheet S is contaminated with the deposited toner.

FIG. 7 is a schematic view for illustrating the deposition of the toner onto the outer secondary transfer roller 11 which causes the back contamination and which is caused during the secondary transfer of the toner onto the perforated sheet. As shown in FIG. 7, in the case of the perforated sheet(S), the toner transferred from the intermediary transfer belt 80 passes through the perforated portion 202 toward the outer secondary transfer roller 11 side, so that the toner is deposited on the outer secondary transfer roller 11. Thereafter, another S is fed to the secondary transfer portion T2, so that a back surface of another sheet S is contaminated with the toner T deposited on the outer secondary transfer roller 11. Such back contamination is not conspicuous in the case where an amount of the toner deposition on the outer secondary transfer roller 11 is small, but by repetition of the secondary transfer of the toner onto the perforated sheet, the amount of the toner deposited on the outer secondary transfer roller 11 increases, so that the deposited toner appears as the back contamination in the case where the toner amount exceeds an allowable amount of the toner capable of being carried by the outer secondary transfer roller 11.

Therefore, instead of the warning screen 1301 (see FIG. 5), a warning display to the effect that the back contamination is capable of generating on the sheet S and a warning image indicating the back contamination of the sheet S may be displayed. Or, at least one of the warning display to the effect that the back contamination is capable of generating on the sheet S and the warning image indicating the back contamination may also be displayed. A modified example of the warning screen is shown in FIG. 8.

As shown in FIG. 8, in the sheet set screen, together with the set mode screen 1302, the warning screen 1303 is displayed. In the warning screen 1303, a warning display to the effect that there is a liability that the back contamination is generated on the back surface of the sheet S with formation of the image on the perforated sheet is made. Further, in the warning screen 1303, a warning image showing the back contamination capable of generating on the back surface of the sheet S with the formation of the image on the perforated sheet is displayed.

Further, in the warning screen 1303, a selection screen 1304 for causing the user to select whether to execute the back contamination elimination control, for suppressing the back contamination, in an operation in an image quality priority mode or in an operation in a productivity priority mode is displayed. The user is capable of selecting either one of the image quality priority mode and the productivity priority mode depending on a degree of the back contamination by making reference to the warning display and the warning image. In the case of the selection screen 1304 shown in FIG. 8, when "YES" is selected, the back contamination elimination control is set to the operation in the image quality priority mode, and when "NO" is selected, the back contamination elimination control is set to the operation in the productivity priority mode. In other words, in the selection screen 1304, information on execution or non-execution of the operation in the image quality priority mode is displayed.

The back contamination elimination control will be described. The back contamination can be suppressed by executing the back contamination elimination control. In the back contamination elimination control, the toner deposited on the outer secondary transfer roller 11 is returned to the intermediary transfer belt 80 by executing, for a predetermined time, an operation in which the sheet S is not caused to pass through the secondary transfer portion T2 and in which a voltage is applied to the outer secondary transfer roller 11 while repetitively switching a polarity of the voltage in a predetermined cycle period. The toner deposited on the outer secondary transfer roller 11 is returned to the intermediary transfer belt 80, so that the back contamination becomes hard to generate on the back surface of the sheet S. Incidentally, the toner returned to the intermediary transfer belt 80 is removed from the intermediary transfer belt 80 by the belt cleaner 22.

FIG. 9 is a timing chart for illustrating the back contamination elimination control. Incidentally, in FIG. 9, the case where an image forming speed is 435 mm/s, an outer diameter of the outer secondary transfer roller 11 is 20 mm, and a period of the outer secondary transfer roller 11 is 144 ms was described as an example. The back contamination elimination control is executed by interrupting an image forming job during execution in the case where an image formed sheet number of the sheets S reaches a threshold or is executed before a start of an image forming job successively executed after an end of the last image forming job.

In the case of the example shown in FIG. 9, in the back contamination elimination control (mode) an operation in which a voltage with an absolute value of 500 V is applied by being alternately switched between a negative polarity (first polarity) and a positive polarity (second polarity) every rotation period of the outer secondary transfer roller 11 is performed three times in a predetermined time. The reason why the voltage is applied by being alternately switched between the positive polarity and the negative polarity opposite to each other is that the polarity of the toner deposited on the outer secondary transfer roller 11 includes a normal charge polarity and a reverse charge polarity, and either one of the toner of the normal charge polarity and the toner of the reverse charge polarity is returned from the outer secondary transfer roller 11 to the intermediary transfer belt 80. However, during execution of the back contamination elimination control, the image cannot be formed on the sheet S, so that the productivity lowers. Therefore, as the operation in the productivity priority mode (first mode) for not lowering the productivity of the image forming apparatus 100, the back contamination elimination control is executed at a frequency of once per 1000 sheets in terms of the image-formed sheet number of the sheets S.

Returning to FIG. 8, the selection screen 1304 is a screen for causing the user to select whether to select execution of the operation in the productivity priority mode in the case where the image-formed sheet number of the sheets S reached a first sheet number (for example, 1000 sheets) or execution of the operation in the image quality priority mode (second mode). The operation in the image quality priority mode (roller mode) is executed in the case where the image-formed sheet number of the sheets S reached a second sheet number (for example, 100 sheets) less than the first sheet number.

In this operation in the image quality priority mode, compared with the operation in the productivity priority mode, the productivity lowers, but a frequency of returning the toner, deposited on the outer secondary transfer roller 11, to the intermediary transfer belt 80 becomes high, and thus an amount of the toner deposited on the outer secondary transfer roller 11 can be made small, so that the back contamination of the sheet S can be suppressed. That is, it is possible to give a priority to a quality of the sheet S (image quality priority mode) without giving a priority to a print speed (productivity priority mode). Incidentally, in the operation in the image quality priority mode, by increasing the number of times of switching of the polarity of the secondary transfer voltage in the back contamination elimination control in the operation in the image quality priority mode than in the operation in the productivity priority mode (for example, three times), the toner in a larger amount may be returned from the outer secondary transfer roller 11 to the intermediary transfer belt 80.

In FIG. 10, a processing flow on a mode setting of the above-described back contamination elimination control is shown. As described above, in the sheet selection screen (see FIG. 5) displayed at the display portion 111, in the case where the determination button 1203 is operated in a state in which the perforated sheet is selected as the kind of the sheet S (S1), the sheet set screen is displayed at the display portion 111. In the sheet set screen, the above-described set mode screen 1302 (see FIG. 5), the warning screen 1303 (see FIG. 8) are displayed (S2). In the warning screen 1303, the selection screen 1304 is displayed as described above.

In the selection screen 1304 of the sheet set screen, depending on whether "YES" is selected or "NO" is selected, the mode selection of the back contamination elimination control is made (S3). In the case where the image quality priority mode is selected ("YES" of S3), setting is made so as to execute the back contamination elimination control at a frequency of once per 100 sheets in terms of the image-formed sheet number of the sheets S (S4). In the case where the productivity priority mode is selected ("NO" of S3), setting is made so as to execute the back contamination elimination control at a frequency per 1000 sheets in terms of the image-formed sheet number of the sheets S (S5).

As described above, in the warning screen 1303, the selection screen 1304 is displayed together with the warning display to the effect that there is a liability that the back contamination generates on the back surface of the sheet S with formation of the image on the perforated sheet and the warning image showing the back contamination capable of generating on the back surface of the sheet S. The selection screen 1304 is a screen for causing the user to select whether to execute the back contamination elimination control in which one of the operation in the image quality priority mode and in the operation in the productivity priority mode. The user is capable of suppressing the generation of the back contamination on the sheet S by selecting the operation in the image quality priority mode.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-065893 filed on Apr. 13, 2023, which is hereby incorporated by reference herein in its entirety.

What is claimed is:

1. An image forming apparatus for forming a toner image on a sheet subjected to perforation processing, wherein the sheet includes a projected portion generated at a periphery of a hole formed by the perforation processing, the image forming apparatus comprising:

a stacking portion on which the sheet is stacked;

a feeding path along which the sheet stacked on the stacking portion is fed;

an image forming unit configured to form the toner image on an image bearing member;

a transfer unit configured to transfer the toner image from the image bearing member onto the sheet fed to the feeding path; and a display configured to display guidance on a placing direction of the sheet depending on a surface where the projected portion of the sheet to be placed on the stacking portion is generated, wherein the display further displays a selection screen for selecting a kind of the sheet, to be placed on the stacking portion, from a plurality of kinds of sheets, and wherein the plurality of kinds of sheets include (1) the sheet subjected to the perforation processing and (2) another sheet which is not subjected to the perforation processing.

2. The image forming apparatus according to claim 1, wherein in a case that the sheet subjected to the perforation processing is selected in the selection screen, the display displays the guidance.

3. The image forming apparatus according to claim 1, wherein the transfer unit transfers the toner image onto the sheet in a transfer nip, wherein the feeding path includes a U-shaped path between the stacking portion and the transfer nip, and wherein the guidance shows that the sheet is placed on the stacking portion so that the surface of the sheet where the projected portion is generated is directed upward.

4. The image forming apparatus according to claim 1, wherein the transfer unit transfers the toner image onto the sheet in a transfer nip, wherein the feeding path includes a U-shaped path between the stacking portion and the transfer nip, and wherein the guidance shows that the sheet is placed on the stacking portion so that a back surface opposite from the surface of the sheet where the projected portion is generated is directed downward.

5. The image forming apparatus according to claim 1, wherein the transfer unit transfers the toner image onto the sheet in a transfer nip, wherein the feeding path includes a straight path between the stacking portion and the transfer nip, and wherein the guidance shows that the sheet is placed on the stacking portion so that the surface of the sheet where the projected portion is generated is directed downward.

6. The image forming apparatus according to claim 1, wherein the transfer unit transfers the toner image onto the sheet in a transfer nip, wherein the feeding path includes a straight path between the stacking portion and the transfer nip, and wherein the guidance shows that the sheet is placed on the stacking portion so that a back surface opposite from the surface of the sheet where the projected portion is generated is directed upward.

7. The image forming apparatus according to claim 1, wherein the stacking portion includes a cassette and a manual feeding tray, and wherein the guidance shows that the sheet is placed on the cassette so that the surface of the sheet where the projected portion is generated is directed toward a first side, and shows that the sheet is placed on the manual feeding tray so that the surface of the sheet where the projected portion is generated is directed toward a second side opposite from the first side.

8. The image forming apparatus according to claim 1, wherein the display further displays a warning screen notifying that contamination by toner is generated on a back surface of the sheet.

9. The image forming apparatus according to claim 1, further comprising a controller configured to execute elimination control for removing toner deposited on the transfer unit.

10. A control method of an image forming apparatus including (1) a stacking portion on which a sheet is stacked, (2) a feeding path along which the sheet stacked on the stacking portion is fed, (3) an image forming unit configured to form the toner image on an image bearing member, and (4) a transfer unit configured to transfer the toner image from the image bearing member onto the sheet fed to the feeding path, the control method comprising:

forming a toner image on a perforated sheet subjected to perforation processing, wherein the perforated sheet includes a projected portion generated at a periphery of a hole formed by the perforation processing;

displaying guidance on a placing direction of the perforated sheet depending on a surface where the projected portion of the perforated sheet to be placed on the stacking portion is generated; and displaying a selection screen for selecting a kind of the sheet, to be placed on the stacking portion, from a plurality of kinds of sheets, wherein the plurality of kinds of sheets include (1) the perforated sheet subjected to the perforation processing and (2) another sheet which is not subjected to the perforation processing.

11. The control method according to claim 10, wherein in a case that the perforated sheet subjected to the perforation processing is selected in the selection screen, the guidance is displayed.

12. The control method according to claim 10, wherein the transfer unit transfers the toner image onto the sheet in a transfer nip, wherein the feeding path includes a U-shaped path between the stacking portion and the transfer nip, and wherein the guidance shows that the perforated sheet is placed on the stacking portion so that the surface of the perforated sheet where the projected portion is generated is directed upward.

13. The control method according to claim 10, wherein the transfer unit transfers the toner image onto the sheet in a transfer nip, wherein the feeding path includes a U-shaped path between the stacking portion and the transfer nip, and wherein the guidance shows that the perforated sheet is placed on the stacking portion so that a back surface opposite from the surface of the perforated sheet where the perforated sheet is generated is directed downward.

14. The control method according to claim 10, wherein the transfer unit transfers the toner image onto the sheet in a transfer nip, wherein the feeding path includes a straight path between the stacking portion and the transfer nip, and wherein the guidance shows that the perforated sheet is placed on the stacking portion so that the surface of the perforated sheet where the projected portion is generated is directed downward.

15. The control method apparatus according to claim 10, wherein the transfer unit transfers the toner image onto the sheet in a transfer nip, wherein the feeding path includes a straight path between the stacking portion and the transfer nip, and wherein the guidance shows that the perforated sheet is placed on the stacking portion so that a back surface opposite from the surface of the perforated sheet where the projected portion is generated is directed upward.

16. The control method according to claim 10, wherein the stacking portion includes a cassette and a manual feeding tray, and wherein the guidance shows that the perforated sheet is placed on the cassette so that the surface of the perforated sheet where the projected portion is generated is directed toward a first side, and shows that the perforated sheet is placed on the manual feeding tray so that the surface of the perforated sheet where the projected portion is generated is directed toward a second side opposite from the first side.

17. A non-transitory computer-readable storage medium storing a program for causing a computer to execute a method of controlling an image forming apparatus including (1) a stacking portion on which a sheet is stacked, (2) a feeding path along which the sheet stacked on the stacking portion is fed, (3) an image forming unit configured to form the toner image on an image bearing member, and (4) a transfer unit configured to transfer the toner image from the image bearing member onto the sheet fed to the feeding path, the method comprising:

forming a toner image on a perforated sheet subjected to perforation processing, wherein the perforated sheet includes a projected portion generated at a periphery of a hole formed by the perforation processing; and displaying guidance on a placing direction of the perforated sheet depending on a surface where the projected portion of the perforated sheet to be placed on the stacking portion is generated, wherein the stacking portion includes a cassette and a manual feeding tray, and wherein the guidance shows that the perforated sheet is placed on the cassette so that the surface of the perforated sheet where the projected portion is generated is directed toward a first side, and shows that the perforated sheet is placed on the manual feeding tray so that the surface of the perforated sheet where the projected portion is generated is directed toward a second side opposite from the first side.

* * * * *